Patented Jan. 11, 1944

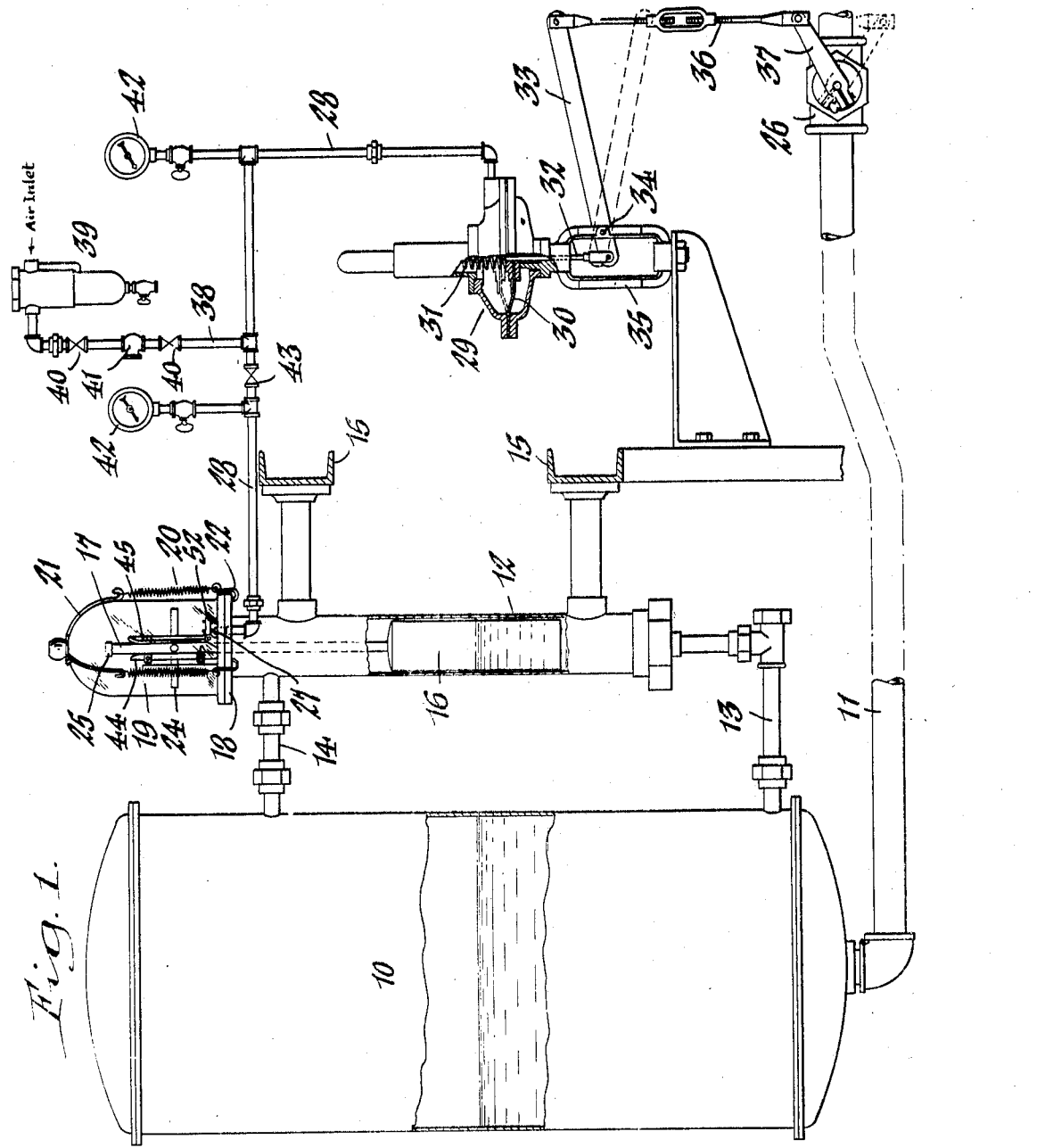

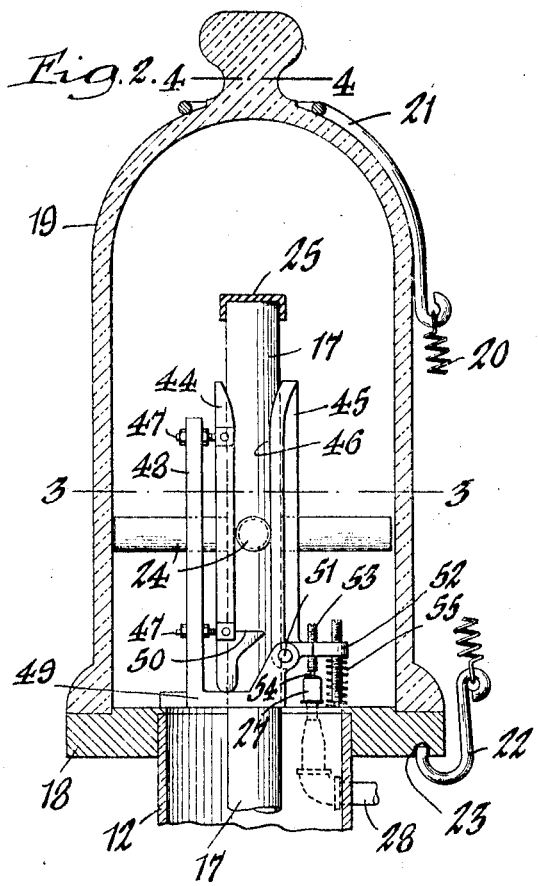

2,339,167

UNITED STATES PATENT OFFICE 2,339,167

LIQUID LEVEL CONTROL FOR EVAPORATORS

Burton S. Hughes, Buffalo, N. Y., assignor to Zaremba Company, Buffalo, N. Y., a corporation of Maine Application April 19, 1941, Serial No. 389,366

6 Claims. (Cl. 137—68)

This invention relates generally to certain new and useful improvements in control equipment for evaporators but more particularly to a liquid level control for use on evaporators for concentrating milk.

It has for one of its objects to provide a sanitary control device of this character which is designed to meet the exacting requirements of milk evaporators, and whose parts in surface contact with the milk are readily accessible for thorough cleansing when desired.

A further object of the invention is to provide a liquid level control which can be readily installed on the evaporator and wherein its valve structure for admitting milk to the evaporator is controlled by the vacuum in the evaporator body.

A still further object is to provide a device of this character which is designed to serve a dual purpose of liquid level control as well as a gauge, and thereby visibly indicate at all times the level of the milk in the evaporator body.

Other features of the invention reside in the construction and arrangement of parts hereinafter described and particularly pointed out in the appended claims.

In the accompanying drawings:

Figure 1 is a side elevation of an evaporator, partly in section, showing my control device applied thereto and partly in section to show the float. Figure 2 is an enlarged transverse vertical section of the float-controlled valve-actuating mechanism. Figure 3 is a cross section taken on line 3—3, Figure 2. Figure 4 is a similar section taken on line 4—4, Figure 2. Figure 5 is a sectional elevation of a slightly modified form of the invention.

Similar characters of reference indicate corresponding parts throughout the several views.

Referring now to the preferred embodiment of the invention shown in Figures 1 to 4, inclusive, 10 indicates an evaporator body to the lower end of which is connected a liquid feed line 11. Disposed at one side of the evaporator body and paralleling the same is a float chamber 12 which is connected at its lower end to the lower end of the evaporator body by a pipe line 13, while its upper end is vacuum connected with such body by an equalizing pipe line 14 at a point above the liquid level thereof. This float chamber may be connected at its opposite side to suitable adjoining supports 15.

Operating in this float chamber is a cylindrical float 16 having a stem 17 rising therefrom which extends through the open flanged end 18 of such chamber into a communicating auxiliary chamber 19 preferably formed by a glass bell jar seated at its lower end on the float chamber flange to make an airtight joint therewith. This bell jar is removably held in place by a clamping unit consisting of a plurality of coil springs 20 removably connected at their upper ends to a yoke or spider 21 applied to the top of the glass jar and connected at their lower ends to hooks 22 adapted to engage corresponding sockets 23 formed in the bottom side of the chamber flange 18. Adjacent its upper end the float-stem 17 has radial guide arms 24 extending therefrom which are adapted to contact with the walls of the bell jar 19 and thereby guide the upper end of the float-stem in a true vertical path. If desired, the top of the stem may be provided with a rubber tip 25 which is adpated to engage the top of the bell jar when the float reaches its extreme upward position.

A float-controlled operating mechanism is provided for governing the feed of the liquid through the feed line 11 into the evaporator body 10, said feed line having a valve 26 therein for shutting off or admitting the milk or other liquid to the evaporator. The mechanism for automatically controlling the opening and closing movements of this valve in response to the changing levels of the liquid in the evaporator is pneumatically or fluid-pressure controlled, as by the vacuum in the evaporator body, and preferably consists of a ball or like valve 27 screwed into the top side of the flange 18 within the bell jar 19 and connected by a pipe line 28 with a vacuum-operated diaphraghm motor 29. This motor may be of any suitable and well known construction, that shown in the drawings including a diaphragm 30 normally pressed downward by a spring 31 and with the chamber above the diaphragm connected to the pipe line and the chamber below vented to the atmosphere. Depending from this diaphragm is a stem 32 connected to one end of a rock lever 33 pivoted intermediate its ends at 34 to the supporting yoke 35 of the diaphragm motor, while the other arm of such lever is connected by a link 36 to a crank-arm or handle 37 applied to the valve 26 in the liquid feed line 11. Interposed in the pipe 28 between the bell jar 19 and the diaphragm motor 29 is an atmospheric air inlet pipe 38 having an air filter 39 associated therewith. In this pipe 38 between its connection to the pipe line 28 and its air filter 39 are two needle valves 40 and an orifice plug fitting 41, the latter being so proportioned that approximately one-half pound of air per hour will leak into the system under vacuum. Vacuum gauges 42 are connected to the pipe 28 at opposite sides of the connection of the air inlet pipe 38 thereto, and a second needle valve 43 is interposed in said pipe 28 between said pipe 38 and the valve 27. When the latter is opened, as when the milk level in the evaporator falls below a predetermined level, the air in the piping sysem 28, 38 and the diaphragm motor 29 passes through the valve 27 into the evaporator thus establishing the same vacuum above the motor-diaphragm 30 as exists in the evaporator. The atmospheric pressure on the lower side of the diaphragm then forces the latter upwardly against the tension of the spring 31 and causes the lever 33 to be rocked in a direction to open the valve 26, as shown by dotted lines in Figure 1, and admit milk to the evaporator. When the liquid in the evaporator again reaches a predetermined level, the valve 27 is then automatically closed and air is admitted from the filter 39 into the pipe lines 38 and 28 to reduce or entirely break the vacuum in the chamber of the diaphragm motor 29. As the vacuum decreases above the diaphragm 30, the latter is forced downwardly by the spring 31 to rock the lever 33 in the opposite direction or to the full line position shown in Figure 1, and gradually close the feed supply valve 26.

In operation, the diaphragm motor 29 will not travel quickly from one position to the other, as the needle valves 40, 43 are properly adjusted to modulate the travel of the diaphragm and cause a gradual opening or closing of the feed line valve 26 as the milk level in the evaporator falls or rises.

The valve 27 is adapted to be automatically opened or closed in response to the movements of the float 16 when the liquid level in the evaporator falls below a predetermined level or when the liquid rises to such predetermined level, respectively. For this purpose, and constituting a part of the float-controlled operating mechanism, there is provided in the glass bell 19 for actuation by one of the arms 24 of the float 16 a means for effecting the opening and closing of the valve 27. This means preferably consists of relatively fixed and movable members 44, 45, respectively, which are arranged in spaced, substantially parallel relation to form a radially-disposed upright slot or guideway 46 therebetween for the passage of one of the float-carrying arms 24, the upper ends of these members flaring outwardly, as shown in Figures 1 and 2, to facilitate the entrance of such arm into this guideway on the down movement of the float. The relatively fixed member 44 is adjustably mounted for lateral movement toward and from the companion movable member 45 on horizontal adjusting screws 47 applied to the upright bracket 48 of a base 49 suitably secured to the float chamber flange 18 and housed within the glass jar 19. At its lower end the member 44 has a shoulder 50 against which the companion guide arm 24 of the float is adapted to abut in an extreme lowered position of the float. The movable member 45 is in the form of a vertically-swinging lever pivoted at its lower end 51 to the base 49 and having an arm 52 extending therefrom containing an adjusting pin or screw 53 whose lower end is adapted to engage the stem 54 of the valve 27 to govern its opening and closing movements. A light spring 55 interposed between the lever arm 52 and the top side of the flange 18 serves normally to urge the lever member 45 toward the companion stationary member 44 to a valve-closing position to insure steady operation. By this construction, when the float 16 moves downwardly, the lever member is caused to be displaced outwardly by the contacting guide arm 24 of the float and automatically effects the opening of the valve 27 to in turn actuate the diaphragm motor 29 to open the feed line valve 26. As the float rises and the contacting guard arm 24 moves upwardly along the lever member 45, the latter is moved inwardly by the spring 55 and the valve 27 is gradually closed with the result that the diaphragm motor is caused to automatically close the feed line valve and prevent the further flow of liquid into the evaporator body.

Instead of using the vacuum in the evaporator body as the motive power for automatically controlling the level of the liquid therein, compressed air may be employed for similarly actuating the diaphragm motor to control the opening and closing of the valve 26 in the liquid feed line. Such a modification of the invention is shown in Figure 5, wherein an air filter 56 is connected to a source of compressed air and leading from the filter is a pipe 57 connected to a diaphragm motor 58 whose diaphragm 59 is normally urged upwardly by a spring 60 and whose stem 61 is connected intermediate its ends to a vertically-swinging lever 62 pivoted at one end at 63 and operatively connected at its other end to the feed line valve 26. Interposed in this pipe between the filter and the diaphragm motor is an orifice plug fitting 64, a needle valve 64ª and a pressure gauge 65. Also interposed in the pipe 57, between the filter and the orifice fitting, is a valve 66 which is attached to the float chamber flange 18 and whose stem 67 extends into the bell jar 19 for actuation by the lever member 45 of the float-control mechanism. The extent of the opening of this valve 66 determines the rate of air supply to the diaphragm motor 58. When the valve 66 is depressed or closed, due to a lowering of the liquid level in the evaporator, the air in the pipe 57 and diaphragm motor is exhausted through the orifice fitting 64 and the spring 60 raises the diaphragm to effect the opening of the feed valve 26. When the level in the evaporator body is restored, the valve 67 is raised or opened to allow the compressed air to enter the pipe 57 and act on the diaphragm 59 to lower it and automatically effect the closing of the feed valve. The needle valve 65 is properly adjusted to prevent a too abrupt displacement of the diaphragm in either direction so that the opening and closing movements of the feed valve are gradual.

While manifestly simple and compact in construction, this liquid level control mechanism is reliable and efficient in operation, it effectually meets the exacting requirements presented in the use of milk and similar evaporators, and its parts are so organized and arranged as to be readily dismembered for cleaning purposes.

I claim as my invention:

1. In a device of the character described, a float chamber provided at its upper end with a detachable auxiliary chamber, a float in said float chamber and having a stem extending into its auxiliary chamber, a pipe line for a fluid pressure medium including a valve mounted on said float chamber having an actuating stem extending into said auxiliary chamber, relatively displaceable members disposed in the auxiliary chamber alongside the float-stem to provide a space therebetween, one of said members being disposed in a fixed position of adjustment and the other, being pivoted to swing vertically and having a part in operative engagement with said valve-stem, and means on said float-stem and movable at predetermined times into and out of the space between said members for displacing the valve-stem-engaging member to govern the opening and closing movements of said valve in response to the changing levels of the float in the float chamber.

2. In a device of the character described, a float chamber provided at its upper end with a detachable auxiliary chamber, a float in said float chamber and having a stem extending into its auxiliary chamber, a pipe line for a fluid pressure medium including a valve mounted on said float chamber having an actuating stem extending into said auxiliary chamber, relatively displaceable members disposed in the auxiliary chamber alongside the float-stem to provide a space therebetween, one of said members being in operative engagement with said valve-stem, and radial arms extending from said stem in guiding contact with the walls of said auxiliary chamber, one of said arms being engageable at predetermined times into and out of the space between said members for displacing the valve-stem-engaging member to govern the opening and closing movements of said valve in response to the changing levels of the float in the float chamber.

3. In a device of the character described, a float chamber provided at its upper end with a communicating auxiliary, transparent chamber, means for detachably connecting said auxiliary chamber in air-tight relation to the float chamber, a float in said float chamber having a stem extending therefrom into its auxiliary chamber, a pipe line for a fluid pressure medium including a valve housed in said auxiliary chamber and having an actuating stem extending into the same, and complementary means disposed in said auxiliary chamber including a displaceable part in operative relation to said valve-actuating stem for governing its opening and closing movements and a part applied to the float-stem in guiding engagement with the walls of said auxiliary chamber for contacting engagement with said displaceable part for governing said valve in response to the changing levels of the liquid in the float chamber.

4. In a device of the character described, a float chamber having a float operable therein and adapted for connection at its lower end to a body whose liquid level is to be controlled and at its upper end to such body at a point above the liquid level thereof, an auxiliary chamber detachably connected to the upper end of said float chamber in communicating relation therewith, a pipe line for a fluid pressure medium including a normally closed valve adapted to be opened for communication with said auxiliary chamber, a displaceable actuating member disposed in the last-named chamber and in operative relation with said valve for controlling its opening and closing movements, a laterally-adjustable member disposed in a relatively fixed, spaced relation to said displaceable member and forming therewith an upwardly opening throat, and a stem applied to said float extending into said auxiliary chamber and having means thereon for guiding engagement with said throat and adapted to be presented into and out of contacting engagement with said displaceable actuating member for shifting the same to open and close said valve in response to the lowering and raising movements, respectively, of the float.

5. In a liquid level control, a float chamber having a float operable therein and adapted for communication adjacent its lower end with the liquid in the body whose liquid level is to be controlled, a transparent chamber detachably mounted at the upper end of said float chamber, a pipe line for a fluid pressure medium including a valve in said transparent chamber, and float-controlled means housed in said transparent chamber and operatively engageable with said control valve to govern its opening and closing movement in response to the changing levels of the liquid in the float chamber, said means including a radial arm on the float-stem and relatively displaceable members disposed to form a throat between which said arm is adapted to travel, one of said members being normally fixed and adjustable toward and from the companion member and the latter being pivoted to swing vertically in response to engagement by said arm and having a portion in operative controlling relation with said valve.

6. In a liquid level control for evaporators, a float chamber adapted for communication at its lower end with the liquid in the evaporator body whose liquid level is to be controlled and provided at its upper end with an auxiliary chamber including means for detachably connecting it in fluid-tight relation to the float chamber, said auxiliary chamber being in communicating relation with the vacuum in the evaporator body above the liquid level thereof, a float operable in the float chamber and having a stem rising therefrom including a radial arm extending into said auxiliary chamber, a line for a fluid pressure medium leading from said auxiliary chamber and including a control valve having the stem thereof extending into the latter, and an actuating lever disposed in the auxiliary chamber and having a part in operative engagement with said valve-stem and a part disposed along the path of travel of the float-stem for engagement by the radial arm thereof at predetermined times in the movement of the float to displace said lever in a direction to open said valve in response to the changing levels of the liquid in the float chamber, said lever having a spring connected thereto for normally urging it in a direction to close such valve.

BURTON S. HUGHES.